US008009121B1

(12) United States Patent
Stuart et al.

(10) Patent No.: US 8,009,121 B1
(45) Date of Patent: Aug. 30, 2011

(54) NARROWCAST MEDIA CONTENT DISTRIBUTION AND DISPLAY SYSTEM WITH CONTENT BIASING ENGINE

(75) Inventors: Kenneth R. Stuart, London (CA); Edward D. Elliott, London (CA); Bryan Andrew Krawetz, London (CA); Jayesh Kumar Patel, London (CA)

(73) Assignee: EK3 Technologies, Inc., London, Ontario (CA)

( * ) Notice: Subject to any disclaimer, the term of this patent is extended or adjusted under 35 U.S.C. 154(b) by 3017 days.

(21) Appl. No.: 10/032,795

(22) Filed: Dec. 26, 2001

Related U.S. Application Data

(60) Provisional application No. 60/257,626, filed on Dec. 22, 2000.

(51) Int. Cl.
*G09G 5/00* (2006.01)
(52) U.S. Cl. ........... 345/1.1; 345/1.2; 345/2.1; 345/656; 345/619; 345/636
(58) Field of Classification Search .................. 345/1.1, 345/1.2, 2.1, 3.1, 418, 522, 619, 625, 634, 345/636, 656; 707/999.104; 715/736; 709/229, 709/224, 201; 219/679; 705/2, 8
See application file for complete search history.

(56) References Cited

U.S. PATENT DOCUMENTS

| 4,761,641 | A | * | 8/1988 | Schreiber | 345/1.3 |
| 5,606,336 | A | * | 2/1997 | Yuki | 345/1.1 |
| 5,950,207 | A | * | 9/1999 | Mortimore et al. | 707/999.104 |
| 5,999,944 | A | * | 12/1999 | Lipkin | 707/999.104 |
| 6,020,889 | A | * | 2/2000 | Tarbox et al. | 715/736 |
| 6,032,119 | A | * | 2/2000 | Brown et al. | 705/2 |
| 6,121,593 | A | * | 9/2000 | Mansbery et al. | 219/679 |
| 6,473,794 | B1 | * | 10/2002 | Guheen et al. | 709/223 |
| 6,490,626 | B1 | * | 12/2002 | Edwards et al. | 709/229 |
| 6,557,102 | B1 | * | 4/2003 | Wong et al. | 713/176 |
| 7,519,703 | B1 | * | 4/2009 | Stuart et al. | 709/224 |
| 2002/0091991 | A1 | * | 7/2002 | Castro | 717/106 |

OTHER PUBLICATIONS

WO 99/13415; A Digital trust center for medical image authentication; Inventors: Wong, Stephen et al. Pub. date 18 Marech 1999.*

* cited by examiner

*Primary Examiner* — Prabodh M Dharia
(74) *Attorney, Agent, or Firm* — Mintz Levin, Cohn, Ferris, Glovsky, and Popeo P.C.

(57) ABSTRACT

A media content distribution and display system and method that includes a central server, a number of remote display devices, and an electronic network for communicating therebetween. The central server receives and stores a plurality of media content, where each of the media content has one or more attributes associated therewith that relate to characteristics of the media content. The remote display devices receive via the electronic network the media content from the central server. Each remote display device includes at least one electronic display, one or more target attributes associated with the remote display device that relate to environmental variables of the remote display device, and a biasing engine for comparing the media content attributes with the target attributes, and for causing the electronic display to display only those of the media content having one or more of the attributes associated therewith that satisfy a predetermined matching criteria.

64 Claims, 8 Drawing Sheets

NARROWCAST MEDIA CONTENT DISTRIBUTION AND DISPLAY SYSTEM WITH CONTENT BIASING ENGINE

This application claims the benefit of U.S. Provisional Application No. 60/257,626, filed Dec. 22, 2000, and entitled Media Distribution System With Content Biasing Engine For Contextual Marketing.

FIELD OF THE INVENTION

The present invention relates networked display signs, and more particularly to hardware and software that implements the narrowcast of media content to selected display signs that is automatically changed based upon global and local environmental variables.

BACKGROUND OF THE INVENTION

Electronic displays (e.g. television, liquid crystal, gas plasma, light emitting diode, etc.) have become increasingly popular for use as broadcast advertisement and/or informational signs. The nature of the content displayed on these devices has varied greatly, and has included static images (usually conforming to the generally accepted digital image file standards such as JPEG, TIFF or GIF), full motion video (usually conforming to generally accepted digital video standards such as MPEG), textual based information, and/or audio. Multiple pieces of content are typically sequenced into a loop that may last several minutes. These types of signs have been placed in public areas and commercial establishments to advertise products and services, and to provide news and information to viewers. The content can be broadcast to the electronic displays from a central server.

Each sign requires a local device to control the electronic display. A networked computer, often referred to as the client computer, is typically used as the local device and generally consists of at least a central processing unit, a video display subsystem, an electronic network subsystem and a storage medium. The client computer is connected to the electronic display device via the video subsystem. The client computer is also connected to a network that enables media content to be electronically transferred from a centralized server to the client computer. Once the content has been delivered, and possibly cached on the client computer's storage medium, the content is visually displayed on the electronic display device.

Two methods have typically been used to initiate the transfer of content from the server to the client computer, and the display of the transferred content on the electronic display. The first method is performed by a human operator that decides when the transfer of the content to the client computer should begin. The operator manually instructs the server to transfer specified content to a specific remotely located client computer. The instruction from the operator may further include instructions on when the particular content is to be displayed. The second method utilizes a server computer that runs software to schedule the transfer and/or display of the content based upon time. This method enables some automation of the process of initiating the transfer and display of content.

Both the manual and the scheduled methods of transferring and displaying the content to the client computers have limitations. The manual transfer/display method is labor intensive and prone to human error, especially given the many details involved in a complex, high volume server network. Mistakes in the decision process, and even typographical errors, can result in the improper or failed delivery and/or display of content. Moreover, for larger networks, it is a daunting task to manually initiate the transfer of different content to hundreds or even thousands of separate client computers on a single network, even with computer scripts that help the human operator. Manually managing such a network of displays would be next to impossible if that content was to individually change on a regular basis.

Automating the process of transferring individual content to individual client computers is essential, and has been done using time based scheduling. However, this process entails time consuming human pre-programming of the server's software to transfer content at specific times, and scheduling the display of such content. For example, a scheduling system may instruct content XYZ to be transferred from the server (location A) to a client computer (location B) at a specific time (say 11:00 am) on a specific date, but to be displayed starting at a different time (say 11:15 am). Given each separate content can have its own matrix of client computers and transfer/display times, a tremendous amount of programming still needs to be performed. Another problem is that the human operator is still required to be intimately involved with the details of what location should receive which content and when that should happen. Once again these details introduce a cause for concern and will eventually introduce human error.

Another flaw with automated scheduling is that it does not allow for changes to happen efficiently between the time the content has initially been scheduled to transfer and when the transfer actually occurs. Time based scheduling simply does not take into account certain environmental variables at over 1000 client locations that are constantly changing, where each could effect the ideal selection of what content should be transferred and displayed at each of the remote locations. If these variables were changing on an hourly basis, it would be impossible for the human operator to implement appropriate and timely scheduling changes. Even if an operator could physically manage to implement content changes based upon environmental variable changes, it would tend to be like a switch that simply changes from repeatedly playing one content piece, or a sequence of content pieces, to playing a different content piece or sequence of content pieces, which is not necessarily ideal. Many times it is ideal to change the mix of displayed content at just one or selected signs only, not the entire content or sequence of content on all signs, given a change in a particular environmental variable. Existing content display networks simply fail to provide such a service or function because they are broadcast systems, meaning they broadcast content throughout the entire network without any consideration of local or particular variables associated with each sign.

There is a need for a networked system of display devices that automatically monitors certain environmental variables for each display device, and transfers and displays a desired mix of content in response to the monitored variables via a narrowcast network.

SUMMARY OF THE INVENTION

The present invention solves the aforementioned problems by providing a narrowcast media content distribution and display system that includes a network of display signs, where each sign displays an individual mix of content that is automatically changed based upon global and local environmental variables.

The present invention is media content distribution and display system that includes a central server for receiving and storing a plurality of media content, an electronic network for communicating with the central server, and a plurality of remote display devices for receiving via the electronic network the media content from the central server. Each of the media content has one or more attributes associated therewith that relate to characteristics of the media content. Each of the remote display devices includes at least one electronic display, one or more target attributes associated with the remote display device that relate to environmental variables of the remote display device, and a biasing engine for comparing the media content attributes with the target attributes, and for causing the electronic display to display only those of the media content having one or more of the attributes associated therewith that satisfy a predetermined matching criteria with respect to the one or more target attributes.

In another aspect of the present invention, the media content distribution and display system includes a plurality of remote display devices for storing and displaying media content each having one or more attributes associated therewith that relate to characteristics of the media content, and an electronic network. Each of the remote display devices includes at least one electronic display, one or more target attributes associated with the remote display device that relate to environmental variables of the remote display device, and a biasing engine for comparing the media content attributes with the target attributes, and for causing the electronic display to display only those of the media content having one or more of the attributes associated therewith that satisfy a predetermined matching criteria with respect to the one or more target attributes. The electronic network is connected to each of the plurality of remote devices for sending at least some the media content and the one or more attributes associated therewith from one of the remote display devices to another of the remote display devices.

In yet another aspect of the present invention, the media content distribution and display system includes a central server, and electronic network and a plurality of remote display devices. The central server is for receiving and storing a plurality of media content, wherein each of the media content has one or more attributes associated therewith that relate to characteristics of the media content. The electronic network is for communicating with the central server. The plurality of remote display devices is for receiving via the electronic network the media content from the central server. Each of the remote display devices includes at least one electronic display, and one or more target attributes associated with the remote display device that relate to environmental variables of the remote display device, and at least one biasing engine for comparing the media content attributes with the target attributes of the plurality of remote display devices. For each one of the plurality of remote display devices, the biasing engine causes the electronic display to display only those of the media content having one or more of the attributes associated therewith that satisfy a predetermined matching criteria with respect to the one or more target attributes of the one remote display device.

In still yet another aspect of the present invention, a method of distributing and displaying media content on a distribution system having a central server that communicates with a plurality of remote display devices via an electronic network, each of the remote display devices including at least one electronic display and one or more target attributes associated therewith that relate to environmental variables of the remote display device, the method including the steps of storing a plurality of media content on the central server, wherein each of the media content has one or more attributes associated therewith that relate to characteristics of the media content, and for each one of the plurality of remote display devices, the method includes comparing the media content attributes with the one or more target attributes, and displaying on the electronic display only those of the media content having one or more of the attributes associated therewith that satisfy a predetermined matching criteria with respect to the one or more target attributes.

In still yet one further aspect of the present invention, the method of distributing and displaying media content on a distribution system having a plurality of remote display devices that communicate with each other via an electronic network, each of the remote display devices including at least one electronic display, a local storage medium, and one or more target attributes associated therewith that relate to environmental variables of the remote display device, the method includes the steps of storing a plurality of media content on the local storage mediums, wherein each of the media content has one or more attributes associated therewith that relate to characteristics of the media content, and for each one of the plurality of remote display devices the method includes the steps of comparing the media content attributes with the one or more target attributes, and displaying on the electronic display only those of the media content having one or more of the attributes associated therewith that satisfy a predetermined matching criteria with respect to the one or more target attributes.

Other objects and features of the present invention will become apparent by a review of the specification, claims and appended figures.

DETAILED DESCRIPTION OF THE PREFERRED EMBODIMENTS

Figure 1:
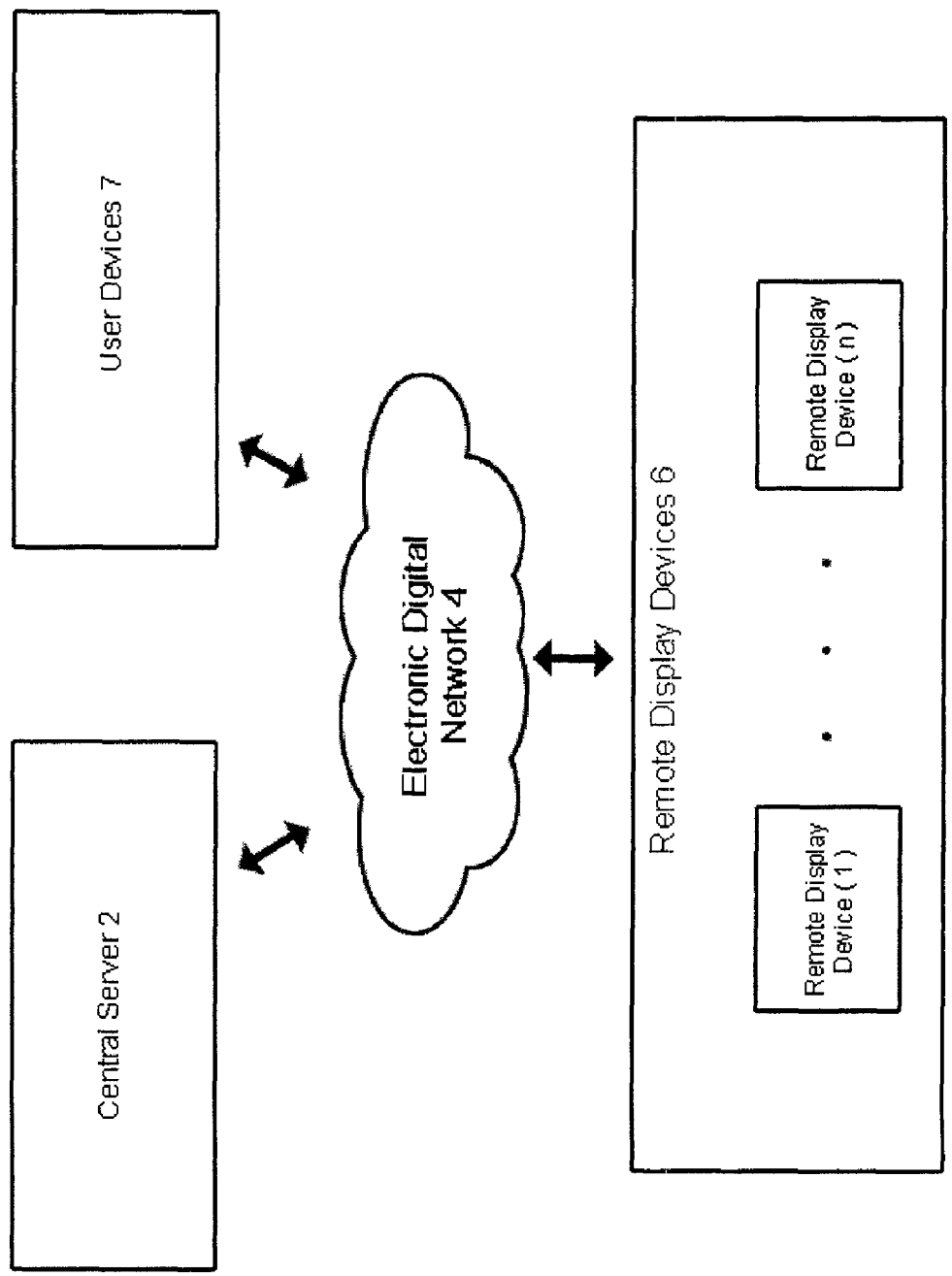
FIG. 1 is a schematic diagram showing the narrowcast distribution and display system of the present invention.

The present invention is a narrowcast media content distribution system as illustrated in FIG. 1, which includes a central server 2 for distributing media content over an electronic digital network 4 (such as a dedicated network and/or the Internet) for display at one or more remote display devices 6. One or more user devices 7 are also connected to network 4 for managing the media content distribution system. Network 4 could be a single network, or a plurality of separate networks or direct data lines.

Media content used with the present invention includes electronic files or streaming data that forms visual still images, video, text, and/or audio. Not only can each media content constitute discrete or multiple visual/audio images played consecutively, but also constitute various aspects of a single image or video. For example, one content media could form the streaming video for a 10 second advertisement for a particular name brand drink. Other content media could form the visual image of various flavors of that drink which can be inserted in the advertisement. Thus, as conditions change (e.g. outside temperature gets hot), the displayed flavor of the drink can be changed without having to change the entire video advertisement file. Another example would be the price of product displayed with the product itself, where the price can be changed independently from the product image, which adds versatility to the system while minimizing the bandwidth needed to store and transfer files that display the entire matrix of possible combinations.

Central Server 2

Figure 2:
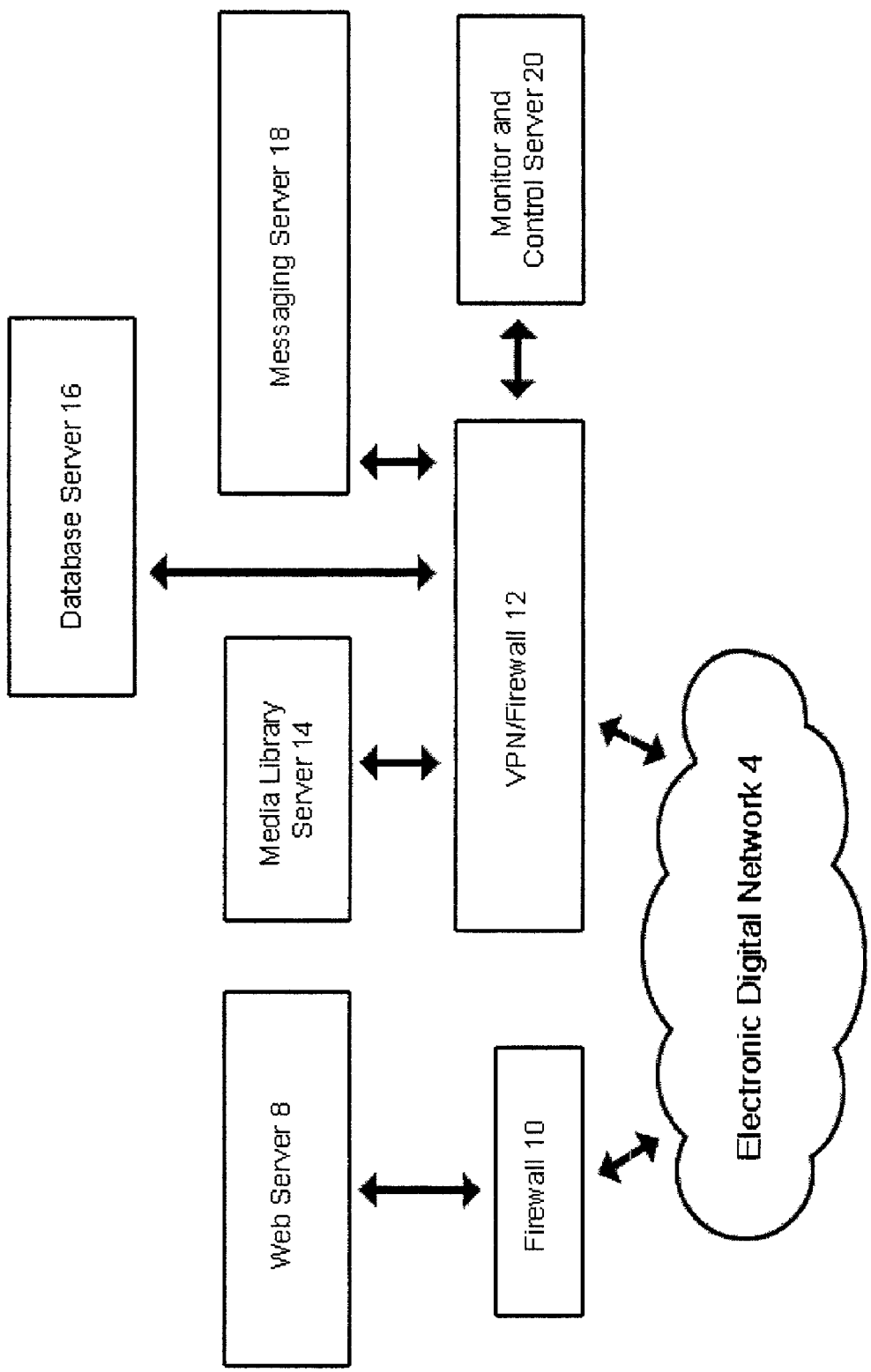
FIG. 2 is a schematic diagram showing the central server of the present invention.

FIG. 2 illustrates the preferred components and configuration of the central server 2, which allows for a maximum amount of electronic network security and overall system reliability. Preferably, each subcomponent of the central server 2 illustrated in FIG. 2 is a separate server computer, but any of these components could be combined together into a single computer. The term 'server' is commonly known in the art as a computer or computer subcomponent containing a microprocessor and memory for communicating with other computer or electronic devices. An example of the type of server that could be used is a IBM xSeries 230 with RAID Storage, tape back-up and hot swappable power supply systems. This server can be modified over time as processing loads increase due to an increase in the number of remote display devices, media content and users. The subsystems that make up a central server 2 are a web server 8, a media library server 14, a media data base server 16, a messaging server 18, and a monitor and control server 20. Web server 8 communicates with the network 4 via a firewall 10, and remaining subsystems communicate with the network 4 via VPN/firewall 12. The preferred VPN/firewall unit is a Cisco 7100 Series VPN router which supports up to 3000 simultaneous VPN tunnel connections. All of these subsystems have electronic internal server networking capabilities, and communications therebetween are managed via this internal network. The central server 2 is connected to the network 4 via a transfer control protocol/internet protocol (TCP/IP).

Figure 3:
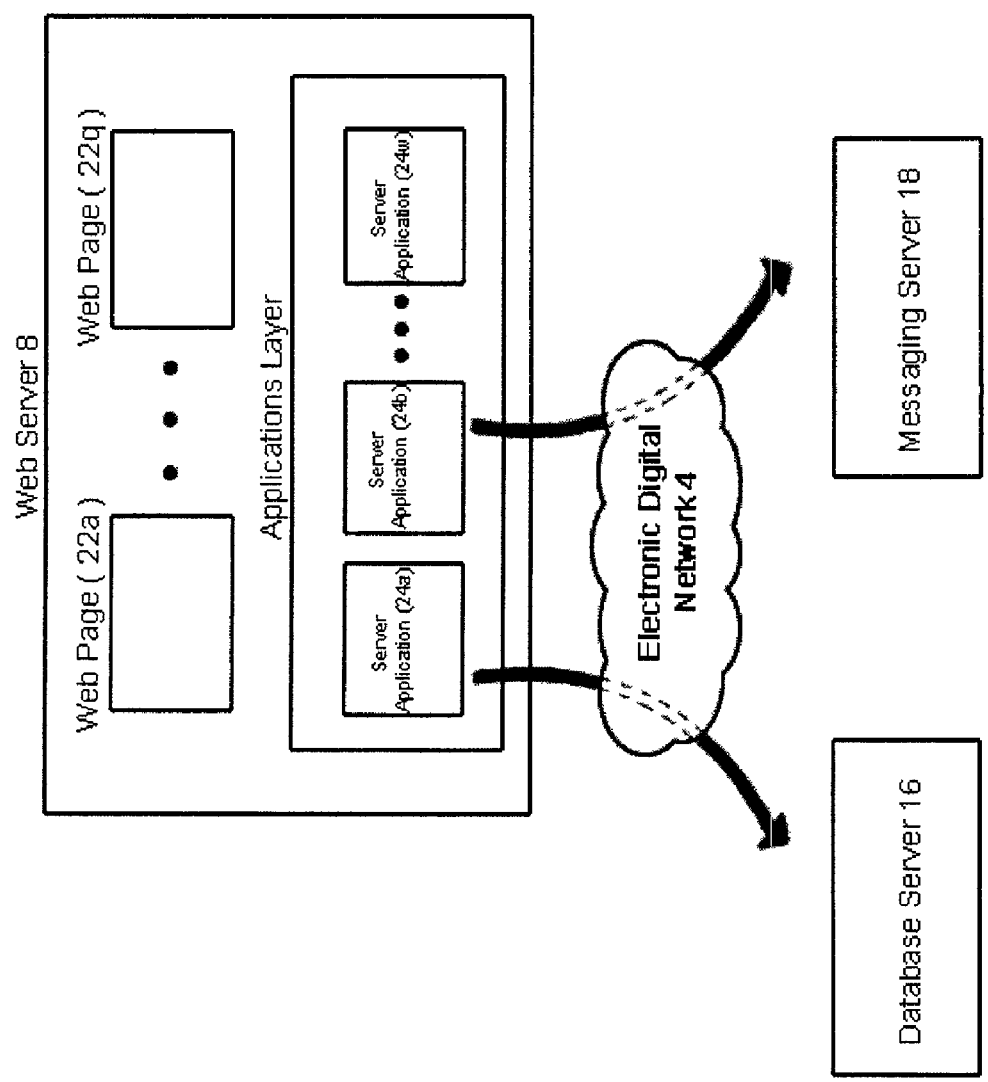
FIG. 3 is a schematic diagram showing the web server of the present invention.

The web server 8 is a computer having memory and a local storage medium for containing web server software that manages users accessing web pages that provide the interface to the overall system. Preferably, web server 8 is connected to the network 4 via firewall 10 for security. For network security reasons, web server 8 is preferably not behind VPN/Firewall 12, but instead communicates to the rest of the server 2 subcomponents via network 4 and VPN/firewall 12. Web server 8 is illustrated in more detail in FIG. 3, and includes a plurality of stored web pages 22a . . . 22q and sever applications 24a . . . 24w. Web server 8 performs many general functions mostly via the layer of applications 24a . . . 24w, such as presenting the user interface to system users, transforming data entered by users into data that is transferred via network 4 to the database server 16, processing and transforming information into XML based messages that are sent via network 4 to messaging server 18, and providing temporary storage for the media content itself which is eventually transferred to the media library server 14. Some of the specific functions performed by the web server interface to the overall network include login, logout, uploading of media content, description of content as biased or scheduled, creation of new content or combinations of new content, edit combinations of content, deletion of content from the system, set active/inactive status of content, search for content previously uploaded to the system, provide a report on a content's status (e.g. where and under what conditions it was played), etc.

Figure 4B:
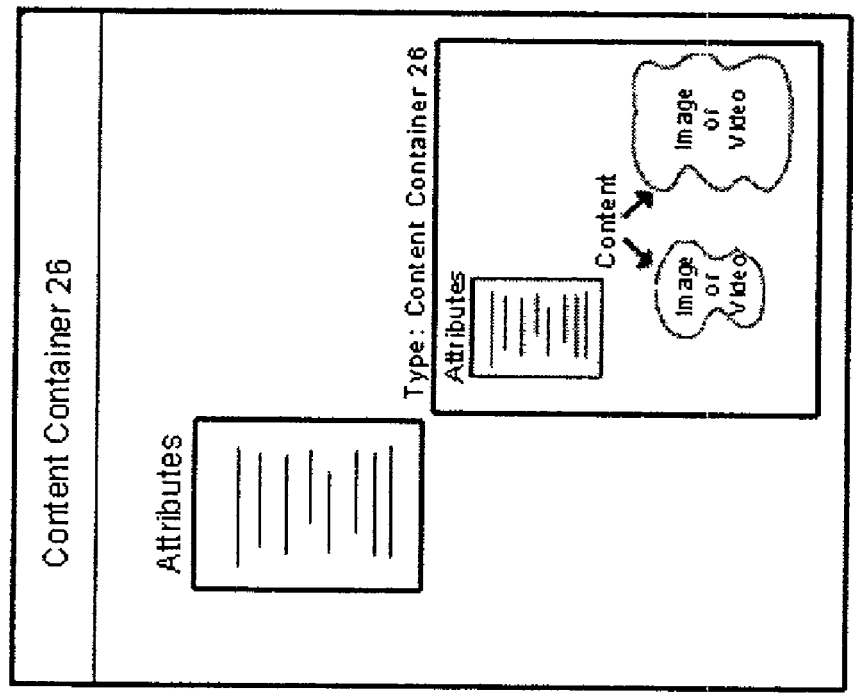
FIGS. 4A and 4B are schematic diagrams showing the content containers of the present invention.
Figure 4A:
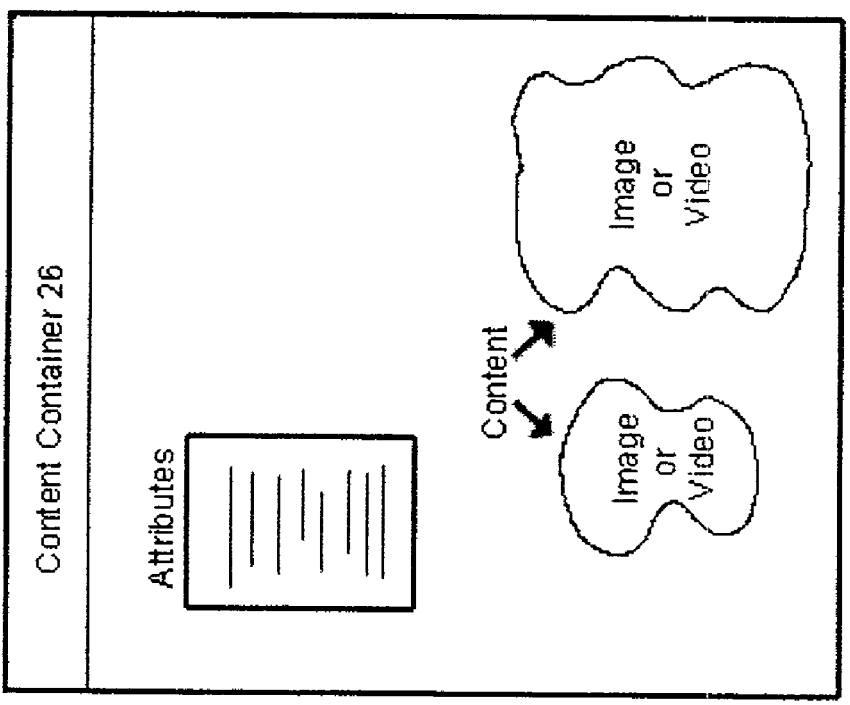

Media library server 14 is connected to network 4 via VPN/Firewall 12. The sole function of media library server 14 is to provide an electronic storage medium for media content that is to be displayed on one or more remote display devices 6. The media content is visual and/or audio content that are referenced by or contained within content containers 26, as illustrated in FIGS. 4A and 4B. Each content container 26 includes a set of attributes that describes the characteristics of the content container, the media content itself (e.g. visual image, video, and/or audio), and possibly information regarding other content containers 26 and the relationship therebetween. For example, if the media content relates to hot beverages such as coffee, then attributes for the media content may include words like "morning" or "cold" to indicate that this media content is best displayed during the mornings and/or when outside temperatures are cold. A content container 26 can contain one or more discrete media contents (as shown in FIG. 4A), or even other content containers 26 (as shown in FIG. 4B). As explained below, some content containers 26 would not contain any media content, but rather would include information identifying where the media content is stored (e.g. on the media library server 14 or on one or more remote display devices 6).

The database server 16 is responsible for storing the content containers 26. Database Server 16 receives the data that forms the content container 26 from web server 8 via network 4. The content containers 26 reside on the database server 16 for download to one or more remote display devices 6. The database server 16 also receives messages from the message server 18 pertaining to inserting, updating or deleting a content container 26.

In the preferred embodiment, all the content containers 26 on the data base server 16 do not contain any of the media content, but rather include links to the locations on media library server 14 at which the respective media content can be found. Preferably, when content containers 26 are downloaded to the remote display devices 6, the media content associated with the content containers are transferred therewith or therein so that the media library server 14 need not be accessed later when the media content is to be displayed.

The messaging server 18 manages messages (communications and/or commands) between the subcomponents of the central server 2 and all remote display devices 6. An XML based protocol is preferably used to pass these messages between the central server subcomponents. Such messages would include commands to delete or transfer certain media content, and transfer of environmental condition data. Examples of messages are described later in more detail. These messages are transported to their destination via network 4.

In the preferred embodiment, monitor and control server 20 is the only server component that runs independently of the other servers. This is because of its important role of ensuring that all remote display devices 6 are fully operational. This server manages remote installations of software and upgrades on the remote display devices 6 as well as monitoring the performance of these devices for early detection of faults. The functions it performs therefore include all critical processes and conditions that need to be monitored and periodically checked to ensure the remote display devices 6 are all operating correctly. Such process and conditions include proper types of digital displays being used at the remote client device 6, whether the digital displays are turned on and off at the right times, the amount of space left on a remote display device's storage medium, the version of software running at the remote display device 6, the status of network 4, etc. Monitor and control server 20 communicates with all remote display devices 6 via network 4, and is capable of installing new software versions at remote display devices 6 should older software versions be detected.

Remote Display Devices 6

Figure 5:
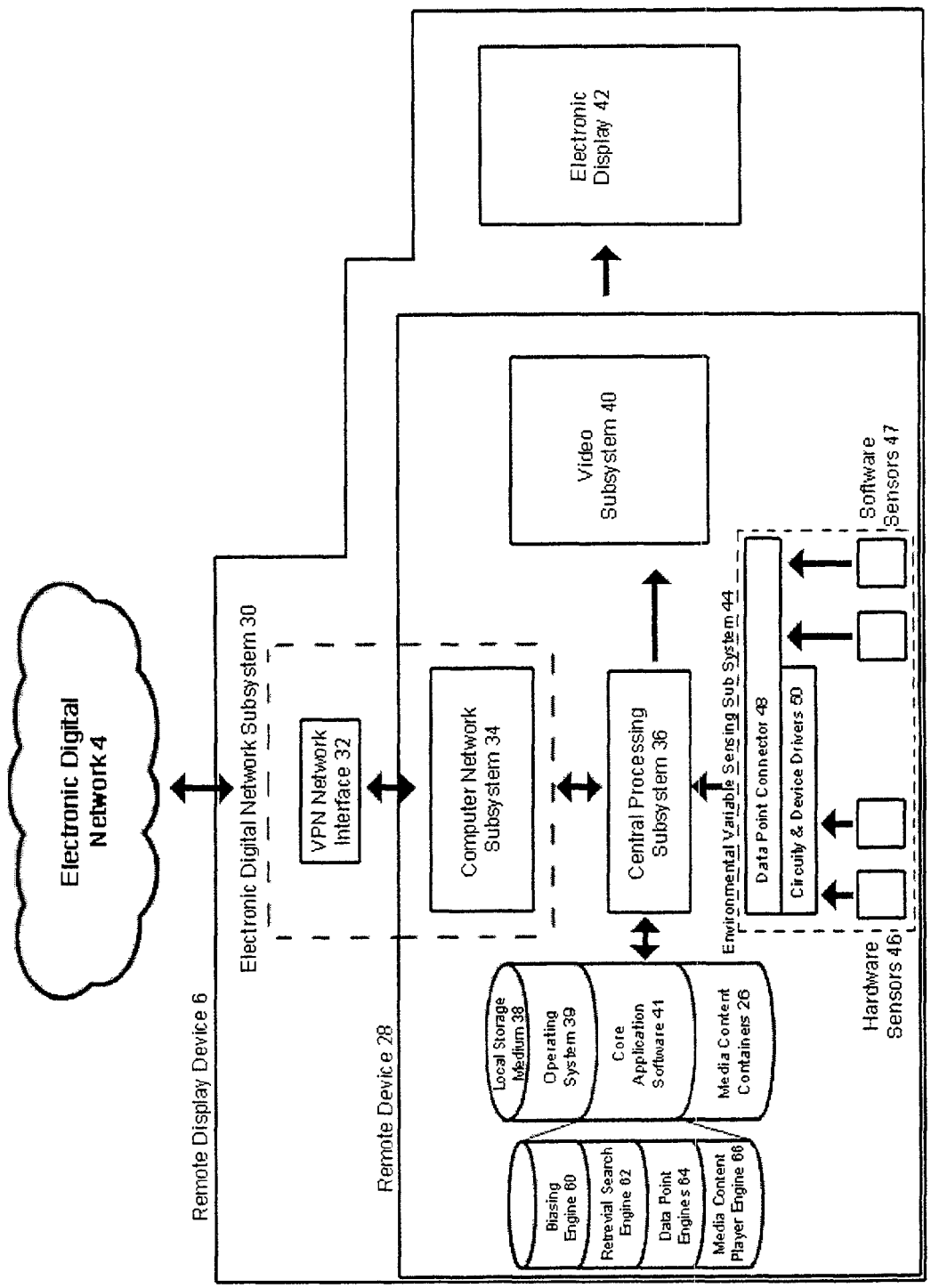
FIG. 5 is a schematic diagram showing the remote display device of the present invention.

As illustrated in FIG. 5, each remote display device 6 includes an electronic digital network subsystem 30, a central processing subsystem 36, a local storage medium 38, a video subsystem 40, and at least one electronic display unit 42. Preferably, most of these components are contained within a remote device computer 28 and communicate with each other via a standard electronic computer bus. Alternately, these components can be configured to communicate with each other via an electronic digital network that is local to the remote display device 6. The ideal location for the electronic display units 42 are points of contact where retailers and marketers can deliver targeted messages to consumers. There are four common points of contact where electronic displays 42 of the present invention are best placed: 1) points-of-view (public areas, outdoor spaces, shopping centers, restaurants), 2) points-of-transaction (ATMs, kiosks, banks), 3) points-of-sale (cash register, line-ups), and points-of-decision (shelves, in-store, drive-thru's).

Each remote display device 6 is connected to network 4 via the electronic digital network subsystem 30. This subsystem includes a VPN network interface 32 and a computer networking subsystem 34. The preferred VPN/Firewall unit is a LITE+VPN/Firewall router module manufactured by SnapGear, Salt Lake City, Utah. The computer networking subsystem 34 provides two-way communication between the remote display device 6 and the central server 2, including digital networking communications allowing digital media content to be transferred from the central server 2 to the remote display device 6, and periodic status reports to be transferred back to the central server 2 regarding the status of the remote display device 6. The VPN network interface 32 ensures that a secure network connection is maintained between the computer network subsystem 34 and a the central server 2 via the network 4.

The local storage medium 38 stores the operating system 39 that manages the remote device computer 28, core application software 41 and the media content containers 26 downloaded from the central server 2. The media content containers 26 contain references to the media content stored locally for display on the digital display 42, or contain references to media content stored at a location within the system (e.g. central server 2) from which media content can be obtained. In fact, the media content containers 26 might not contain any references to media content, indicating that the associated media content is not locally stored. The core application software 41 includes a biasing engine 60, a retrieval search engine 62, data point engines 64 and a media content player engine 66, which are discussed later in more detail. Preferably, all media content received by the remote display device 6 is first cached on the local storage medium 38 prior to being displayed. The media content remains cached until the system determines that it is outdated or the user removes it.

The central processing subsystem 36 includes a microprocessor an related circuitry for loading and executing the operating system 39 and the application software 41. The central processing subsystem 36 provides the video subsystem 40 with a data stream(s) for display on the electronic display 42. The video subsystem 40 is responsible for generating the appropriate electronic video signals required to enable the electronic display 42 to show the image(s). This subsystem is capable of generating signals for a single video display 42, or multiple electronic displays 42 all displaying the same or different media content. Each electronic display 42 contains a display screen and related circuitry required to interpret the electronic video signals from video subsystem 40 and transform them into image(s) displayed on the video display's screen.

Each of the remote display devices 6 preferably includes an environmental variable sensing sub system 44. This subsystem includes a data point connector 48 that receives input from hardware sensors 46 and software sensors 47, which are described in more detail later. Hardware sensors 46 (which are well known in the art) are connected to data point connector 48 via appropriate circuitry and device drivers 50, and detect various environmental parameters surrounding the remote display device 6 such as temperature, humidity, ambient light level, noise level, atmospheric pressure, motion, type of products displayed adjacent the electronic display 42, etc. The data from sensors 46/47 is used by the central processing sub system 36 for discriminating which media content gets displayed, and is communicated back to the central server 2 to help it decide which content should be downloaded and displayed at this and other remote display devices 6. Data point connector 48 filters the incoming data, and passes along only that information that is relevant to system's determination of appropriate media content display.

User Device 7

The user devices 7 allow single or multiple users to access the system via the network 4 for the purpose of managing the media content displayed on one or more remote display devices 6. Each user device 7 is preferably a standard personal computer capable of running a web browser to access the network 4 and the components of the system connected thereto. For example, if the system is being used by a fast food chain, the user devices 7 could be located at the individual franchise locations along with the remote display devices 6, and/or at the corporate head office.

Electronic Digital Network 4

The electronic digital network 4 is preferably a TCP/IP based network. Each component described above connects to the network 4 using the TCP/IP protocol. The most common network type used to date is the public infrastructure that comprises the Internet. While network 4 preferably utilizes the Internet, any single or multiple network that provides permanent or semi-permanent connections with the system components can be used (e.g. public telephone lines, cable television systems, dedicated data lines, etc.).

Message Exchange and System Operation

The flow of data between all the above identified components and subsystems is now described, showing how media content is transferred from the central server 2 to the remote display devices 6 in an efficient and unique manner, and how content media is matched to and displayed on the remote display devices 6.

There are six basic types of messages exchanged within the system: content container messages, location descriptor messages, request transfer messages, play messages, and play log messages. These messages are managed by messaging server 18 and generated either by the central server 2 or by one of the remote display devices.

The content container message contains a content container 26. As described above, content container 26 is an abstraction of a multi-media file with attributes that describe the multi-media file (media content) and under what conditions it is to be displayed on one or more electronic displays 42. The content container 26 either contains the media content itself (still image, video, text, sound) and/or possibly other content containers 26, as well as an indication whether the media content is presently stored locally as opposed to somewhere else within the system. The recursive nature of the content container 26 enables a complex set of images and/or videos to be displayed on electronic display 42. The messaging server 18 generates content container messages by interpreting what the user entered via the web pages presented by web server 8.

Location descriptor messages are generated by the remote display devices. This message contains information that describes data conditions relating to the environmental conditions of the remote location in which the remote display device is located, such as temperature, humidity, ambient light level, noise level, atmospheric pressure, motion, type of products displayed adjacent the electronic display 42, the current inventory of such products, local demographics, etc. The messaging server 18 manages these messages as well and can be used to determine which content media should be downloaded to which remote display devices 6.

Request transfer messages are sent from the biasing engine 60 to the remote display devices' retrieval search engine 62. These messages are sent to the retrieval search engine 62 to inform it that local and/or global conditions have changed significantly enough to warrant a transfer of content be performed from central server 2 to the remote display device(s) 6. This is only performed if the media content is not already located on the local storage medium. Once the retrieval search engine 62 has received the request transfer message it proceeds to search the system for the requested content (e.g. in the central server 2 media library 14).

In each remote player device 6, play messages are generated by the biasing engine 60 to dictate which media content is played and when. The player messages are sent to the media content control player 66, which controls the mix of media content displayed on the electronic display(s) 42 of the remote display device 6. The play messages instruct the media content player engine 66 on exactly which multi-media file(s) to play from the local storage medium 38. The content player engine continues to play the requested multi-media file(s) until it has been determined that a data point has changed significantly enough to cause a new mix of content to be played.

Play log messages are generated by the remote display device 6 to keep the central server 2 appraised of where and when a particular piece of media content was requested by a play message and displayed, as well as how often and under what circumstances (e.g. in response to any local and global environmental variables). A play log message is created every time a particular media content is transferred over the network, which typically occurs when the media content is entered into the system, or upon a request from the remote display device 6 in response to a play message. Play log messages are also created each time a play message requests that a particular media content be displayed, as well as each time the remote display device 6 successfully displays the particular media content.

Other communications between the various system components are managed by the messaging server 18. For example, once it is determined that certain media content will no longer be displayed, it would need to be deleted from the system. Messaging server 18 would receive such a command from the web server 8 and then inform the database server 16 as well as all affected remote display devices 6 that the particular media content is to be deleted from the system. Another example of a communication managed by messaging server 18 occurs when it is time to transfer media content from the central server 2 to one or more remote display devices 6. A communication would be sent to one or more remote display devices 6 instructing them to proceed with downloading a particular content container 26 (which contains reference to the media content itself and whether is it stored locally or not) onto the remote display device's local storage medium.

Figure 6:
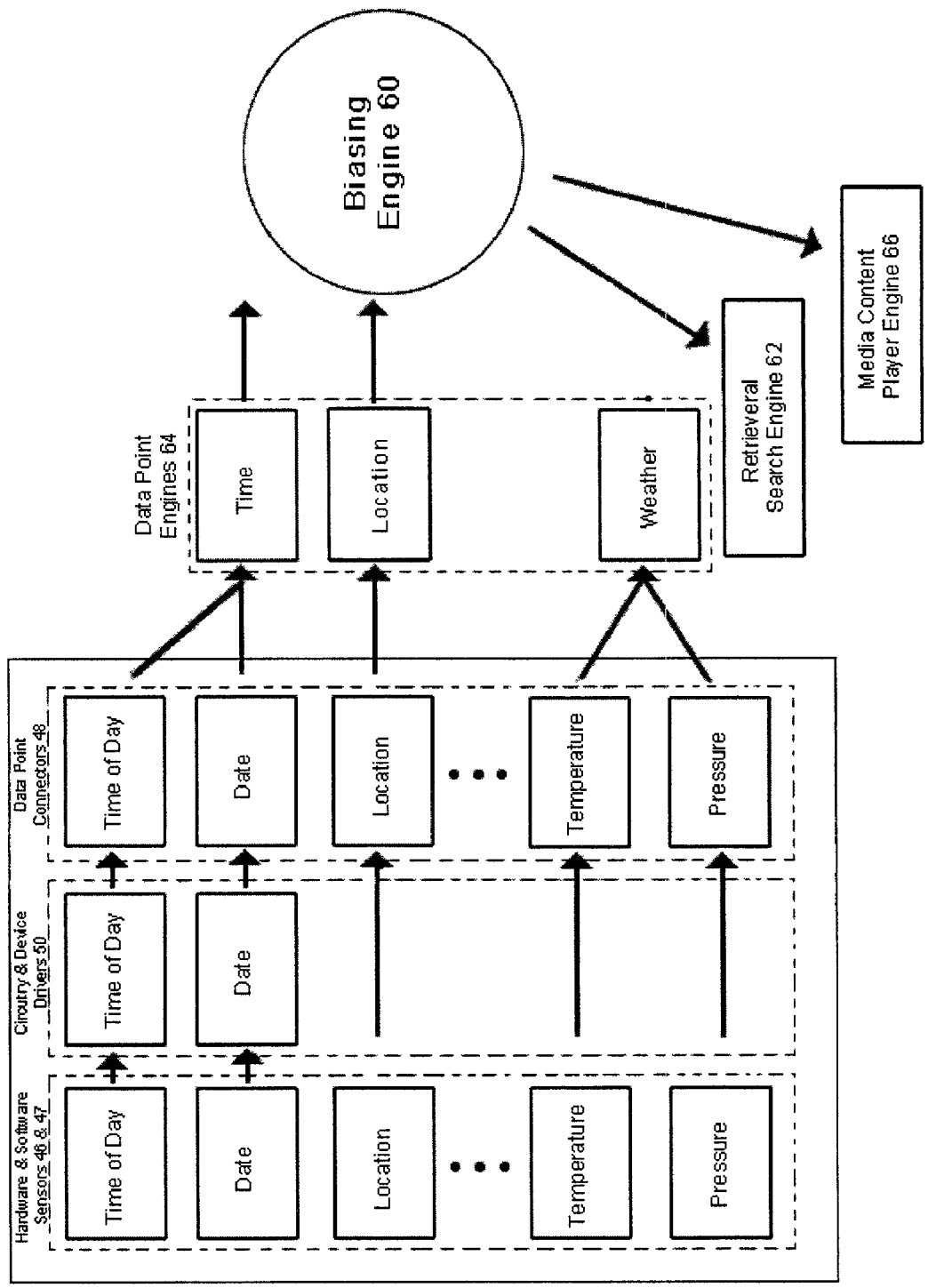
FIG. 6 is a schematic diagram showing the components of the core applications software of the present invention.

FIG. 6 illustrates the dataflow of either local or global environmental variables and how they are fed into the biasing engine 60. Hardware sensors 46 and software sensors 47 collect the raw data that is processed before it is passed to the biasing engine 60. Hardware sensors 46 are typically well known external devices (such as devices that measure time, temperature, pressure, motion, etc.) that are connected to the remote device computer 28. Circuitry and software device drivers 50 pass information from these external devices to the data point connectors 48. Software sensors 47 collect information from other sources of data, such as stock quotes, local or other weather conditions, product inventory, sale information, breaking news, time related information, location information, or any other information from any source that may impact the desired selection of media content for display (including point of sale information currently being inputted by sales persons). Such information is retrieved from local or remote data bases and/or input devices (e.g. a local user device or server, central server 2 or even user devices 7) using a Local, regional or wireless network connection, the Internet, or even network 4. The data point connectors 48 perform the first level of processing on the raw data from the sensors 46/47. The data point connectors 48 extract and delete unwanted data from the stream of sensor data, and/or format the data for further processing by the data point engines 64. The data point engines 64 receive the sensor data from the data point connector 48 and transform the information into a plurality of target attributes that the biasing engine 60 can rank and use to determine which media content is appropriate for display on the remote display device. Any combination of data from the data point connector 48 can be passed to the data point engines 64 for inclusion in the target attributes.

The following example, in conjunction with FIG. 6, illustrates the narrowcast of media content according to the present invention. The time and date data point engines 64 collect time and date information, preferably from the remote device computers system clock. Location data relating to the location of the remote display device 6 is collected either from the local storage medium 38 or from the central server 2 using a unique identification number for the particular remote display device 6. The data point engines 64 then produce a target attribute that defines the time and location of the remote display device 6. The target attribute is created by reducing this information into condensed data that the biasing engine 60 can readily use. For example, the time can be condensed to morning, afternoon and evening target attributes. Thus, the time of 9:04 a.m. at Location A would be transformed into a target attribute that reads: "Early Morning at A". Other combinations of data can be fed into the data point engines 64 for inclusion in new or existing target attributes. For example, a local temperature (e.g. 26 degrees centigrade) is measured at location A by one of the hardware sensors 46 and is fed to the data point engines 64, whereby a second target attribute is created that reads: "Hot at A". By condensing the raw environmental variable data into target attributes, it makes it easier for the biasing engine to rank and act on such data.

Figure 7:
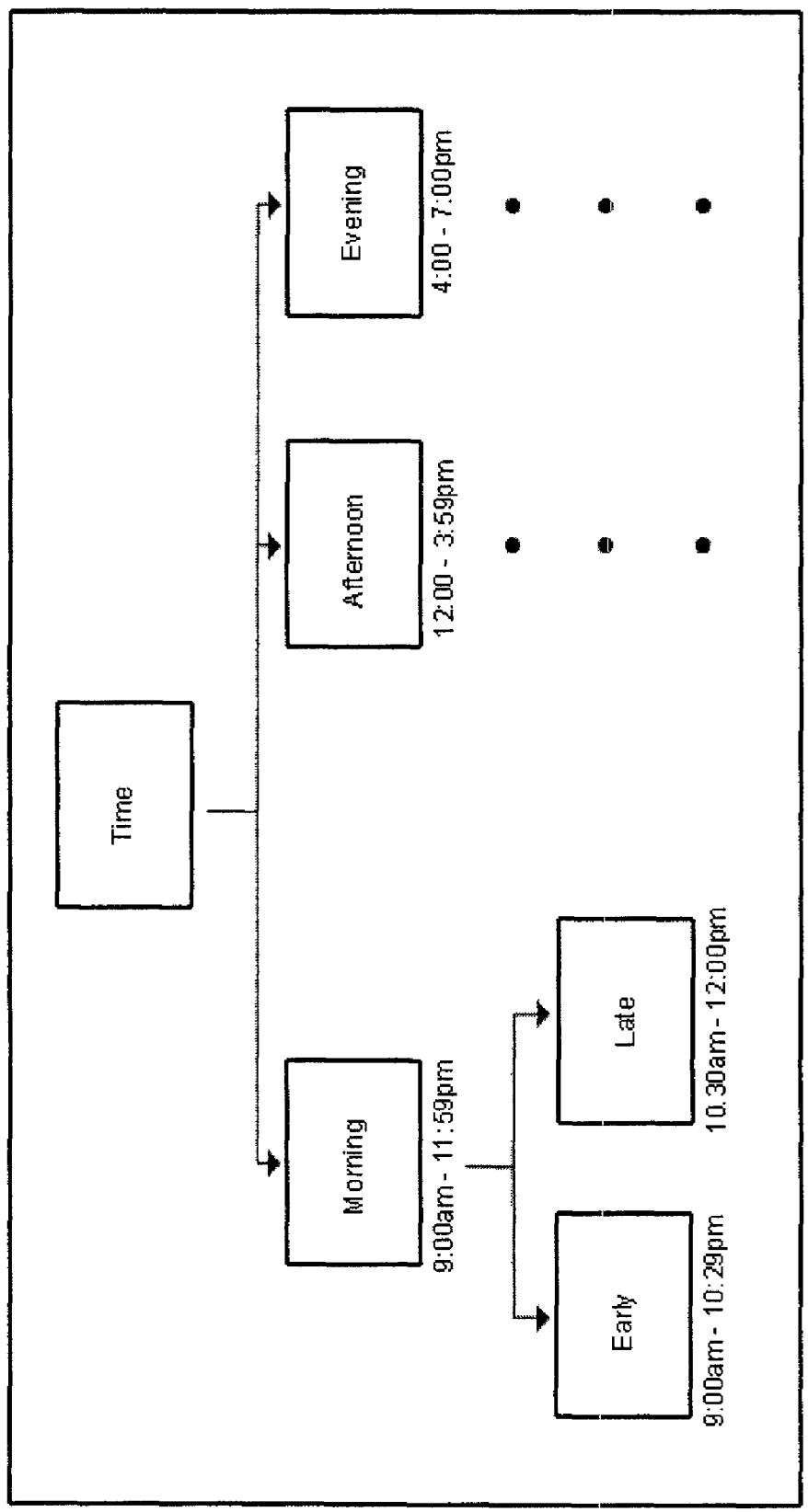
FIG. 7 is a schematic diagram showing the target attribute tree of the present invention.

FIG. 7 illustrates how the preferred embodiment creates target attributes based upon the raw environmental data. Once the data point engine 34 receives a time of 9:04 a.m., a search is performed through a target attribute tree 70. A range of raw data inputs define each level of the tree 70. At the top level is the type of data that is being assigned a target attribute. In this example it is Time. The next level of the tree is then searched until a match of the raw data is within a node of that tree level.

The time of 9:04 a.m. falls into the range of 9:00 a.m.-11:59 a.m., indicating the time belongs within the Morning node. If the tree contains another level below this node, then each node in that lower level is also searched. The time of 9:04 a.m. falls into the range of the Early node. Therefore 9:04 a.m. can be described as Early Morning, which is appropriately applied to all relevant target attributes that include time of day.

The system can utilize a wide variety of environmental variables in making target attributes and content container attributes. Physical environmental variables include precipitation, temperature, atmospheric pressure, temperature, pollen count, humidity, ambient light level, noise level, motion, UV index, etc. Demographic environmental variables include age, gender, culture, language, faith, family size, student traffic after school, occupation, income, average debt, etc. Miscellaneous environmental variables include census data, proximity of electronic display to shelved products, sales information for shelved products, inventory levels of products displayed next to electronic display 42, dated and real-time sales data collected from POS (point of sale) system, sales projections, information relating to prior customer purchases, present and trend data relating to product sales, historical product associations, input from sales clerk (e.g. information on particular customers present in store), news, sports scores, proximity to holidays and special national and local events, etc. All this information is entered into the system via a user device 7, a hardware sensor 46, and/or a software sensor 47. In fact, even wireless or point of sales devices such as cashier machines can be used to enter such information. Each of these environmental variables can be included as separate target attributes, or combined together in target attributes to more uniquely describe the particular conditions currently relating to a remote display device.

Figure 8:
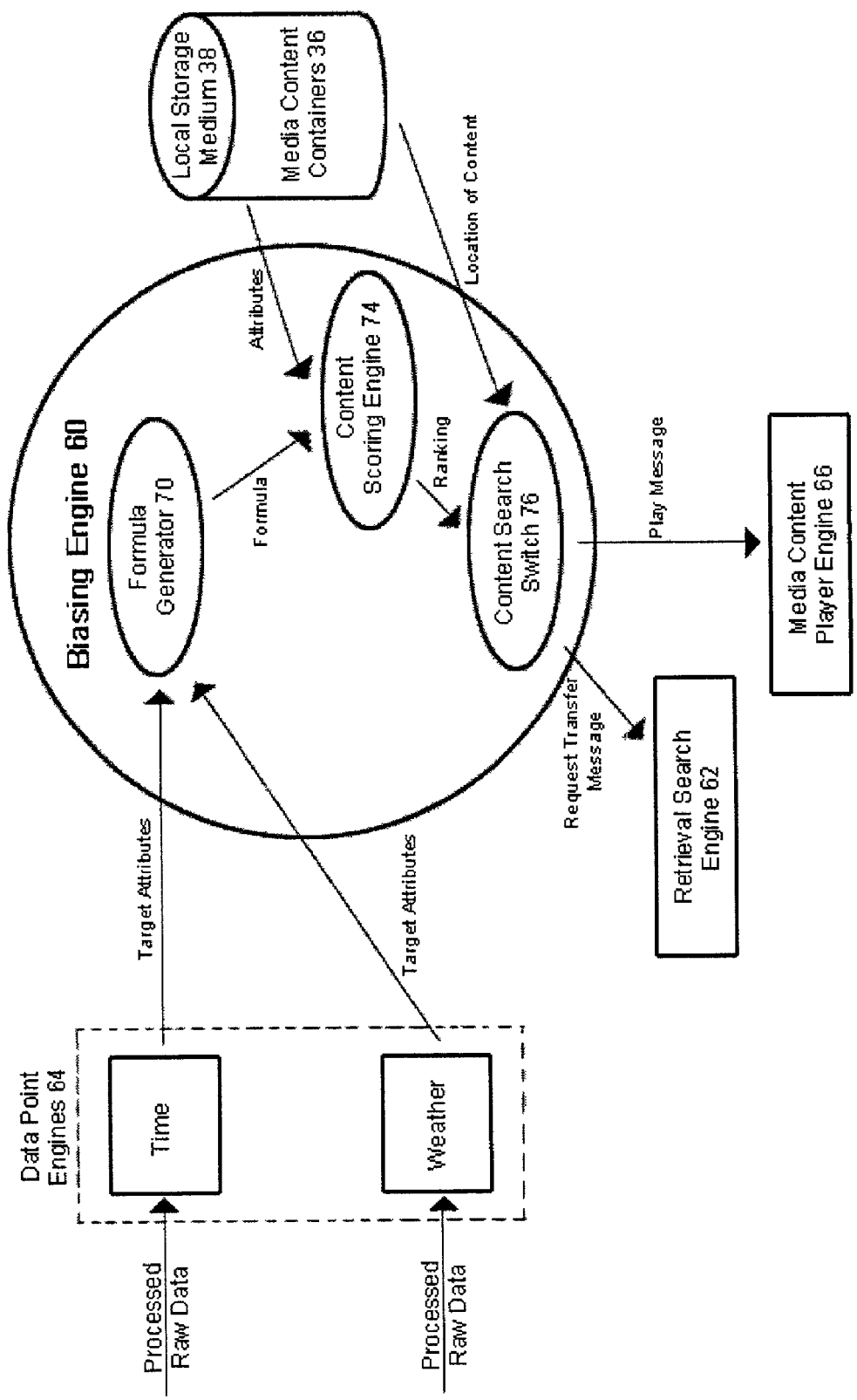
FIG. 8 is a schematic diagram showing the components of the biasing engine of the present invention.

Once the raw environmental data has been processed into target attributes, the target attributes are passed on to the biasing engine 60 for processing. FIG. 8 illustrates the subcomponents of the biasing engine 60 and its operation. The biasing engine 60 includes a formula generator 70, a content scoring engine 74 and a content search switch 76. The various target attributes formed by the data point engines 64 are first sent to the formula generator 70, which produces a mathematical representation (formula) of the target attributes. This formula may simply be a listing of the target attributes currently applicable to the local remote display device 6, or it could further include some sort of weighting scheme that gives more importance to certain target attributes over others. The weighting scheme would preferably be implemented remotely using the user device 7, and could vary among the different remote display devices 6. Thus, the user may designate Time to have a greater level of importance than Temperature. If so, a greater emphasis would be put on the Morning target attribute in the formula over the Hot Temperature target attribute.

The formula from the formula generator 70 is then passed on to the content scoring engine 74, which also accesses all the attributes in the content containers 36 stored on the local storage medium 38. These attributes are preferably for all media content stored anywhere in the network. The content scoring engine 74 compares the formula (based upon the local target attributes) with the attributes of the content containers, looking for target attributes that match the content container attributes. The criteria used to determine a match may simply be whether any target attributes and content container attributes are the same. If there are matches with multiple content containers, they are preferably ranked with the content containers having the most matched attributes being ranked first, or content containers having attributes matching with heavier weighted attributes being ranked first, or a combination thereof.

Once the matches are determined and ranked, they are sent to the content search switch 76, which decides which and how many of the identified, ranked content containers 26 that matched with the target attributes are to be displayed by the remote display device 6. The criteria used by content search switch 76 can vary depending upon the particular environment in which the remote display device is installed. For example, criteria in content search switch 76 could be set to display all matched content containers (assuming that a relatively low number of matches are expected). Or, only the top five get displayed. Or, the top three get a majority of the display time, with the next three getting minimal display time. Or, matched content containers stored locally get priority, at least until other matched content containers are downloaded. As evident from these examples, the criteria used by the content search switch 76 will vary depending upon the user's perceived needs at the remote display devices, and the number of content containers having attributes that are likely to match with the target attributes.

By ranking the matched content containers and/or using weighted target attributes, the system can subtly change the mix of displayed content. For example, consider the weighted target attribute to be the weather conditions outside. If it is extremely hot outside it would be appropriate for the electronic display 42 to be promoting ice cream maybe 90% of the time and hot apple pie only 10% of the time (i.e. there still may be viewers of the sign that would be interested in the hot apple pie despite the hot outside temperatures). As the temperature starts to drop the ratio of time dedicated to promoting ice cream vs. hot apple pie should change appropriately. As the weather becomes cooler, ice cream may only be promoted 25% of the time and hot apple pie be promoted 75% of the time. This gradual change in dedicated display time is referred to as biasing the content, and enables contextual marketing in the industry.

The criteria of the content search switch 76 could also change if there are more than one electronic displays 42 at the remote client player site. If so, then all electronic displays could display the same content. Alternately, each electronic display 42 could have its own target attributes associated with it, meaning that the above described process of matching content with the target attributes is done separately for each electronic display. This would be appropriate, for example, when one electronic display is located near men's shirts for sale (e.g. would want to promote related men's wear), while a second electronic sign is located near women's suits (e.g. would want to promote related women's wear).

The content search switch 76 receives the content container information from the local storage medium. After the content search switch 76 has decided which content containers get displayed, this information is passed along to the media content player engine 66, which causes the media content in the selected media content containers 26 stored on the local storage medium 38 to be displayed on the electronic display(s) 42. If any of the selected content containers are not stored on the local storage medium 38, then the content search switch 76 sends this information to the retrieval search engine 62, which requests that the selected content containers not locally stored be transferred to the local storage medium 38. Once this transfer has been completed, the new locally stored media content can be added to the mix of content being displayed by the electronic display(s) 42.

The following is another example that illustrates the function of the data point connector 48 of the environmental variable sensing sub system 44. Consider a fast food restaurant that sells combinations of its food at a reduced price. The combination may be a hamburger, fries and a soft drink. The remote display device 6 can be configured to electronically receive information on every transaction that occurs at each POS system (e.g. via the hardware/software sensors 46/47). The data packet that represents the transactional event may contain information such as the time and date, applicable taxes, total cost of the transaction as well as the individual items and the sizes that were purchased by the customer. The remote display device 6 can also monitor the sales of fries or directly monitor the inventory of fries presently ready for sale, so that if inventory levels become low, promotional media content being displayed on the electronic display 42 that forms part of the menu board can be adjusted so that the amount of times fries are being promoted can be reduced. The data point connector 48 will perform processing on the data packet from the POS and inventory monitoring systems (which includes irrelevant data) and supply the central processing subsystem 36 only with relevant information (e.g. amount and size of fries sold and/or current inventory). The time of the transaction, the amount of the transaction, and the other items purchased will be filtered out by the data point connector 48.

The media distribution system of the present invention is initially set up by locating the local display devices 6, entering the target attributes for each of these devices 6, and entering content media and their attributes onto the central server 2. The system itself handles the downloading of media content and/or related content containers to the various remote display devices, matching of content media attributes with the target attributes, and displaying appropriate media content at each remote display device on a real time basis. No matter where the system decides to physically locate the media content, it is searchable and accessible for every remote display device 6 in the system, minimizing human operator contact and the possibility of human operator error.

It is to be understood that the present invention is not limited to the sole embodiment described above and illustrated herein, but encompasses any and all variations falling within the scope of the appended claims. For example, while a single central server 2 is illustrated, there could be a plurality of such servers in the network. Alternately, there could be no central server, and instead its functions incorporated into one or more of the remote display devices 6. Moreover, the biasing engines of the local display devices can be instead incorporated into the central server(s) 2, whereby the local display devices 6 simply display received streaming data, only those media content sent to them for local storage, or only those media content that the central server(s) instruct them to display. Although the above described system components are digitally based, analog components could be used where appropriate.

What is claimed is:

1. A media content distribution and display system, comprising:
   a central server for receiving and storing a plurality of media content, wherein each of the media content has one or more attributes associated therewith that relate to characteristics of the media content;
   an electronic network for communicating with the central server; and
   a plurality of remote display devices for receiving via the electronic network the media content from the central server, wherein each of the remote display devices includes:
   at least one electronic display,
   one or more target attributes associated with the remote display device that relate to environmental variables of the remote display device,
   a biasing engine for comparing the media content attributes with the target attributes, and for causing the electronic display to display only those of the media content having one or more of the attributes associated therewith that satisfy a predetermined matching criteria with respect to the one or more target attributes, and
   a local storage medium for storing the media content received from the central server.

2. The system of claim 1, wherein the one or more target attributes associated with one of the plurality of remote display devices is different from the one or more target attributes associated with another one of the plurality of remote display devices.

3. The system of claim 2, wherein the predetermined matching criteria of the biasing engine of one of the plurality of remote display devices is different from the predetermined matching criteria of the biasing engine of another one of the plurality of remote display devices.

4. The system of claim 1, further comprising:
   at least one user device for submitting via the network the media content and the attributes associated therewith to the central server.

5. The system of claim 1, wherein the predetermined matching criteria includes whether any of the media content attributes match any of the target attributes.

6. The system of claim 5, wherein the biasing engine assigns varying weights to 5 target attributes and ranks the media content having attributes matching the target attributes by the weighted target attributes, and wherein the predetermined matching criteria includes consideration of the ranking of the media content.

7. The system of claim 1, wherein each of the remote display devices further comprises:
   hardware sensors for measuring the environmental variables of the remote display device.

8. The system of claim 7, wherein each of the remote display devices further comprises:
   software sensors for measuring the environmental variables of the remote display device.

9. The system of claim 1, wherein each of the remote display devices further comprise:
   a retrieval search engine that searches for and retrieves via the network any of the media content having attributes that satisfy the predetermined matching criteria but are not stored on the local storage medium.

10. The system of claim 9, wherein the retrieval search engine searches for media content stored on the central server and any of the local storage medium's of the remote display devices.

11. The system of claim 9, wherein predetermined matching criteria for each remote display device includes consideration of whether the media content is stored on the local storage medium.

12. The system of claim 1, wherein at least one of the remote display devices comprises a plurality of the electronic displays.

13. The system of claim 12, wherein for the one remote display device: for each of the electronic displays, one or more target attributes are associated therewith that relate to environmental variables of the electronic display,
   the one or more target attributes associated with one of the electronic displays are different from the one or more target attributes associated with another one of the electronic displays, and
   the biasing engine causes each one of the electronic displays to display only those of the media content having one or more of the attributes associated therewith that satisfy a predetermined matching criteria with respect to the one or more target attributes associated with the one electronic display.

14. The system of claim 1, further comprising:
a plurality of the central servers for receiving and storing the plurality of media content.

15. A media content distribution and display system, comprising:
a plurality of remote display devices for storing and displaying media content each having one or more attributes associated therewith that relate to characteristics of the media content, wherein each of the remote display devices includes:
at least one electronic display,
one or more target attributes associated with the remote display device that relate to environmental variables of the remote display device,
a biasing engine for comparing the media content attributes with the target attributes, and for causing the electronic display to display only those of the media content having one or more of the attributes associated therewith that satisfy a predetermined matching criteria with respect to the one or more target attributes; and an electronic network connected to each of the plurality of remote devices for sending at least some the media content and the one or more attributes associated therewith from one of the remote display devices to another of the remote display devices, and
a retrieval search engine that searches for and retrieves via the network any of the media content having attributes that satisfy the predetermined matching criteria but are not stored on the remote display device.

16. The system of claim 15, wherein the one or more target attributes associated with one of the plurality of remote display devices is different from the one or more target attributes associated with another one of the plurality of remote display devices.

17. The system of claim 16, wherein the predetermined matching criteria of the biasing engine of one of the plurality of remote display devices is different from the predetermined matching criteria of the biasing engine of another one of the plurality of remote display devices.

18. The system of claim 15, further comprising:
at least one user device for submitting via the network the media content and the attributes associated therewith to at least one of the remote display devices.

19. The system of claim 15, wherein the predetermined matching criteria includes whether any of the media content attributes match any of the target attributes.

20. The system of claim 19, wherein the biasing engine assigns varying weights to target attributes and ranks the media content having attributes matching the target attributes by the weighted target attributes, and wherein the predetermined matching criteria includes consideration of the ranking of the media content.

21. The system of claim 15, wherein each of the remote display devices further comprises:
hardware sensors for measuring the environmental variables of the remote display device.

22. The system of claim 21, wherein each of the remote display devices further comprises:
software sensors for measuring the environmental variables of the remote display device.

23. The system of claim 15, wherein predetermined matching criteria for each one of the remote display devices includes consideration of whether the media content is locally stored on the one remote display device.

24. The system of claim 15, wherein at least one of the remote display devices comprises a plurality of the electronic displays.

25. The system of claim 15, wherein for the one remote display device:
for each of the electronic displays, one or more target attributes are associated therewith that relate to environmental variables of the electronic display,
the one or more target attributes associated with one of the electronic displays are different from the one or more target attributes associated with another one of the electronic displays, and
the biasing engine causes each one of the electronic displays to display only those of the media content having one or more of the attributes associated therewith that satisfy a predetermined matching criteria with respect to the one or more target attributes associated with the one electronic display.

26. A media content distribution and display system, comprising:
a central server for receiving and storing a plurality of media content, wherein each of the media content has one or more attributes associated therewith that relate to characteristics of the media content;
an electronic network for communicating with the central server; and
a plurality of remote display devices for receiving via the electronic network the media content from the central server, wherein each of the remote display devices includes:
at least one electronic display, and
one or more target attributes associated with the remote display device that relate to environmental variables of the remote display device; and
at least one biasing engine, located at the central server, for comparing the media content attributes with the target attributes of the plurality of remote display devices, wherein for each one of the plurality of remote display devices, the biasing engine causes the electronic display to display only those of the media content having one or more of the attributes associated therewith that satisfy a predetermined matching criteria with respect to the one or more target attributes of the one remote display device.

27. The system of claim 26, wherein the one or more target attributes associated with one of the plurality of remote display devices is different from the one or more target attributes associated with another one of the plurality of remote display devices.

28. The system of claim 26, wherein the predetermined matching criteria of the biasing engine of one of the plurality of remote display devices is different from the predetermined matching criteria of the biasing engine of another one of the plurality of remote display devices.

29. The system of claim 26, further comprising:
at least one user device for submitting via the network the media content and the attributes associated therewith to the central server.

30. The system of claim 26, wherein the predetermined matching criteria includes whether any of the media content attributes match any of the target attributes.

31. The system of claim 30, wherein the biasing engine assigns varying weights to target attributes and ranks the media content having attributes matching the target attributes by the weighted target attributes, and wherein the predetermined matching criteria includes consideration of the ranking of the media content.

32. The system of claim 26, further comprising:
hardware sensors for measuring the environmental variables of the remote display devices.

33. The system of claim 32, further comprising:
software sensors for measuring the environmental variables of the remote display devices.

34. The system of claim 26, wherein each of the remote display devices further comprise:
a local storage medium for storing the media content received from the central server.

35. The system of claim 34, wherein each of the remote display devices further comprise:
a retrieval search engine that searches for and retrieves via the network any of the media content having attributes that satisfy the predetermined matching criteria but are not stored on the local storage medium.

36. The system of claim 35, wherein the retrieval search engine searches for media content stored on the central server and any of the local storage medium's of the remote display devices.

37. The system of claim 35, wherein predetermined matching criteria for each remote display device includes consideration of whether the media content is stored on its local storage medium.

38. The system of claim 35, wherein at least one of the remote display devices comprises a plurality of the electronic displays.

39. The system of claim 38, wherein for the one remote display device: for each of the electronic displays, one or more target attributes are associated therewith that relate to environmental variables of the electronic display,
the one or more target attributes associated with one of the electronic displays are different from the one or more target attributes associated with another one of the electronic displays, and
the biasing engine causes each one of the electronic displays to display only those of the media content having one or more of the attributes associated therewith that satisfy a predetermined matching criteria with respect to the one or more target attributes associated with the one electronic display.

40. The system of claim 26, further comprising:
a plurality of the central servers for receiving and storing the plurality of media content.

41. A method of distributing and displaying media content on a distribution system having a central server that communicates with a plurality of remote display devices via an electronic network, each of the remote display devices including at least one electronic display and one or more target attributes associated therewith that relate to environmental variables of the remote display device, comprising the steps of:
storing a plurality of media content on the central server, wherein each of the media content has one or more attributes associated therewith that relate to characteristics of the media content; and
for each one of the plurality of remote display devices:
comparing the media content attributes with the one or more target attributes, and
displaying on the electronic display only those of the media content having one or more of the attributes associated therewith that satisfy a predetermined matching criteria with respect to the one or more target attributes, wherein the predetermined matching criteria includes whether any of the media content attributes match any of the target attributes.

42. The method of claim 41, wherein the one or more target attributes associated with one of the plurality of remote display devices is different from the one or more target attributes associated with another one of the plurality of remote display devices.

43. The method of claim 42, wherein the predetermined matching criteria for one of the plurality of remote display devices is different from the predetermined matching criteria for another one of the plurality of remote display devices.

44. The method of claim 41, wherein the storing of the plurality of media content on the central server further includes the steps of:
inputting the media content into user device; and
transmitting the inputted media content from the user device to the central server via the electronic network.

45. The method of claim 41, further comprising the step of assigning varying weights to the target attributes; and
ranking the media content having attributes matching the target attributes by the weighted target attributes, wherein the predetermined matching criteria includes consideration of the ranking of the media content.

46. The method of claim 41, further comprising the step of:
measuring the environmental variables of the remote display devices via hardware sensors.

47. The method of claim 46, further comprising the step of:
measuring the environmental variables of the remote display devices via software sensors.

48. The method of claim 41, further comprising the step of:
storing the media content on a local storage mediums of the remote display devices.

49. The method of claim 48, wherein for each of the remote display devices, further comprising the step of:
searching for and retrieving via the network any of the media content having attributes that satisfy the predetermined matching criteria but are not stored on the local storage medium.

50. The method of claim 49, wherein the searching for and retrieving of the media content includes searching the central server and any of the local storage medium's of the remote display devices.

51. The method of claim 48, wherein predetermined matching criteria for each remote display device includes consideration of whether the media content is stored on the local storage medium.

52. The method of claim 41, wherein at least one of the remote display devices comprises a plurality of the electronic displays.

53. The method of claim 52, wherein for each of the electronic displays of the one remote display device:
one or more target attributes are associated therewith that relate to environmental variables of the electronic display such that the one or more target attributes associated with one of the electronic displays are different from the one or more target attributes associated with another one of the electronic displays, and
the displaying of the media content on the electronic display includes displaying only those of the media content having one or more of the attributes associated therewith that satisfy a predetermined matching criteria with respect to the one or more target attributes associated with the one electronic display.

54. A method of distributing and displaying media content on a distribution system having a plurality of remote display devices that communicate with each other via an Electronic network, each of the remote display devices including at least one electronic display, a local storage medium, and one or more target attributes associated therewith that relate to environmental variables of the remote display device, comprising the steps of:

storing a plurality of media content on the local storage mediums, wherein each of the media content has one or more attributes associated therewith that relate to characteristics of the media content; and for each one of the plurality of remote display devices:

comparing the media content attributes with the one or more target attributes, displaying on the electronic display only those of the media content having one or more of the attributes associated therewith that satisfy a predetermined matching criteria with respect to the one or more target attributes, and searching for and retrieving via the network any of the media content having attributes that satisfy the predetermined matching criteria but are not stored on the local storage medium.

55. The method of claim 54, wherein the one or more target attributes associated with one of the plurality of remote display devices is different from the one or more target attributes associated with another one of the plurality of remote display devices.

56. The method of claim 54, wherein the predetermined matching criteria for one of the plurality of remote display devices is different from the predetermined matching criteria for another one of the plurality of remote display devices.

57. The method of claim 54, wherein the storing of the plurality of media content on the plurality of remote display devices further includes the steps of:

inputting the media content into user device; and transmitting the inputted media content from the user device to the plurality of remote display devices via the electronic network.

58. The method of claim 54, wherein the predetermined matching criteria includes whether any of the media content attributes match any of the target attributes.

59. The method of claim 58, further comprising the step of assigning varying weights to the target attributes; and ranking the media content having attributes matching the target attributes by the weighted target attributes, wherein the predetermined matching criteria includes consideration of the ranking of the media content.

60. The method of claim 54, further comprising the step of: measuring the environmental variables of the remote display devices via hardware sensors.

61. The method of claim 60, further comprising the step of: measuring the environmental variables of the remote display devices via software sensors.

62. The method of claim 54, wherein predetermined matching criteria for each remote display device includes consideration of whether the media content is locally stored on the local storage medium.

63. The method of claim 54, wherein at least one of the remote display devices comprises a plurality of the electronic displays.

64. The method of claim 63, wherein for each of the electronic displays of the one remote display device:

one or more target attributes are associated therewith that relate to environmental variables of the electronic display such that the one or more target attributes associated with one of the electronic displays are different from the one or more target attributes associated with another one of the electronic displays, and the displaying of the media content on the electronic display includes displaying only those of the media content having one or more of the attributes associated therewith that satisfy a predetermined matching criteria with respect to the one or more target attributes associated with the one electronic display.

\* \* \* \* \*